United States Patent [19]
Baig

[11] Patent Number: 5,911,818
[45] Date of Patent: Jun. 15, 1999

[54] ACOUSTICAL TILE COMPOSITION

[75] Inventor: Mirza A. Baig, Des Plaines, Ill.

[73] Assignee: USG Interiors, Inc., Chicago, Ill.

[21] Appl. No.: 08/915,014

[22] Filed: Aug. 20, 1997

[51] Int. Cl.[6] ................................. C09D 1/00; E04B 1/74
[52] U.S. Cl. .................................... 106/698; 106/DIG. 2; 106/122; 106/204.01; 106/204.3; 106/217.01; 106/217.3; 162/145; 162/175; 162/181.8; 162/208; 252/62; 252/378 P; 181/294
[58] Field of Search .............................. 106/122, 217.01, 106/204.01, DIG. 2, 698, 204.3, 217.3; 252/62, 378 P; 162/145, 152, 175, 208, 181.8; 181/294

[56] References Cited

U.S. PATENT DOCUMENTS

| | | |
|---|---|---|
| 1,769,519 | 7/1930 | King et al. . |
| 2,501,699 | 3/1950 | Stecker . |
| 2,634,207 | 4/1953 | Miscall et al. . |
| 2,727,827 | 12/1955 | Chertkof . |
| 2,803,575 | 8/1957 | Riddell et al. . |
| 3,379,609 | 4/1968 | Roberts . |
| 3,498,404 | 3/1970 | Roberts . |
| 3,673,088 | 6/1972 | Clements . |
| 3,718,491 | 2/1973 | Yates . |
| 3,847,633 | 11/1974 | Race . |
| 3,952,830 | 4/1976 | Oshida et al. ............................ 252/62 |
| 4,042,406 | 8/1977 | Gray . |
| 4,118,273 | 10/1978 | Godin et al. . |
| 4,126,512 | 11/1978 | Hill . |
| 4,159,302 | 6/1979 | Grove et al. . |
| 4,328,178 | 5/1982 | Kossatz . |
| 4,693,924 | 9/1987 | Kuper et al. . |
| 4,695,494 | 9/1987 | Fowler et al. . |
| 4,698,257 | 10/1987 | Goll . |
| 4,911,788 | 3/1990 | Pittman et al. . |
| 5,013,405 | 5/1991 | Izard . |
| 5,047,120 | 9/1991 | Izard et al. . |
| 5,071,511 | 12/1991 | Pittman . |
| 5,114,617 | 5/1992 | Smetana et al. . |
| 5,250,153 | 10/1993 | Izard et al. . |
| 5,277,762 | 1/1994 | Felegi et al. . |
| 5,277,856 | 1/1994 | Bucking . |
| 5,342,566 | 8/1994 | Schaffer et al. . |
| 5,387,282 | 2/1995 | Jakel . |
| 5,395,438 | 3/1995 | Baig et al. ............................. 106/122 |
| 5,542,358 | 8/1996 | Breslauer . |
| 5,558,710 | 9/1996 | Baig . |
| 5,632,848 | 5/1997 | Richards et al. . |

FOREIGN PATENT DOCUMENTS 1576537  10/1980  United Kingdom .

*Primary Examiner*—Michael Marcheschi
*Attorney, Agent, or Firm*—Donald E. Egan; David F. Janci; John M. Lorenzen

[57] ABSTRACT

A composition suitable for making acoustical tiles in a water-felting process comprises expanded perlite, clay, a binder component selected from the group consisting of starch, latex, cellulosic fiber and mixtures thereof and optionally mineral wool. The use of an expanded perlite having a relatively high density, preferably between about 9 pounds per cubic foot to about 20 pounds per cubic foot, enables the formation of a suitable slurry with a relatively low amount of water and enables a more complete dewatering of the mat prior to drying.

16 Claims, No Drawings

ACOUSTICAL TILE COMPOSITION

FIELD OF THE INVENTION

This invention relates to compositions containing expanded perlite which are useful in manufacturing acoustical tiles and panels for ceiling applications using a water felting process. More particularly, this invention relates to acoustical tile compositions, which include a relatively high density expanded perlite, which can be efficiently fabricated into acoustical ceiling tiles and panels using conventional water felting processes and equipment.

BACKGROUND OF THE INVENTION

The water felting of dilute aqueous dispersions of mineral wool and lightweight aggregate is a well-known commercial process for manufacturing acoustical ceiling tile. In this process, an aqueous slurry of mineral wool, lightweight aggregate, cellulosic fiber, binder and other ingredients, as desired or necessary, is flowed onto a moving foraminous support wire, such as that of a Fourdrinier or Oliver mat forming machine, for dewatering. The slurry may be first dewatered by gravity and then dewatered by vacuum suction means to form a basemat; the wet basemat is then pressed to the desired thickness between rolls and the support wire to remove additional water. The pressed basemat is then dried in heated drying ovens, and the dried material is cut to the desired dimensions and optionally sanded or top coated, such as with paint, to produce acoustical ceiling tiles and panels.

For many years, acoustical ceiling tile has also been made by a wet pulp molded or cast process such as described in U.S. Pat. No. 1,769,519. According to the teaching of this patent, a molding composition comprising granulated mineral wool fibers, fillers, colorants and a binder, in particular a starch gel, is prepared for molding or casting the body of the tile. This mixture or composition is placed upon suitable trays which have been covered with paper or a metallic foil and then the composition screeded to a desired thickness with a screed bar or roller. A decorative surface, such as elongated fissures, may be provided by the screed bar or roller. The trays filled with the mineral wool pulp or composition are then placed in an oven to dry or cure the composition. The dried sheets are removed from the trays and may be treated (e.g. sanded or painted) on one or both faces to provide smooth surfaces, to obtain the desired thickness and to prevent warping. The sheets are then cut into tiles of a desired size.

Mineral wool acoustical tiles are very porous which is necessary to provide good sound absorption. The prior art (e.g. U.S. Pat. Nos. 3,498,404; 5,013,405; 5,047,120 and 5,558,710) also discloses that mineral fillers, such as expanded perlite, may be incorporated into the composition to improve sound absorbing properties and to provide lightweight acoustical tiles and panels.

When used in water felting processes, compositions containing expanded perlite require a high level of water to form a workable aqueous slurry. It has been found that conventional expanded perlite (e.g. perlite having a density of from about 3 to 5 pounds per cubic foot) holds and retains a very high level of water within its structure. Laboratory test show that such conventional expanded perlite can retain as much as 5 times its weight in water. Moreover conventional expanded perlite has a greater volume which requires the use of a larger volume of water to form a slurry suitable for use in a water-felting process. The slurry with the greater amount of water requires the dewatering process to remove more water and produces a basemat containing more water retained by the perlite, which must be dried in a kiln. It has been discovered, however, that expanded perlite having a relatively high density, i.e. from over 7 or 8 pounds per cubic foot to about 20 pounds per cubic foot, retains far less water than conventional expanded perlite. The substitution of such relatively dense perlite for the conventional perlite allows the formation of a suitable slurry with lower amount of water, which provides faster dewatering and the formation of a basemat containing less water. All three of these factors allow the production of acoustical tiles on conventional equipment at higher speeds.

It is an object of this invention to provide an acoustical tile composition which may be more efficiently fabricated into acoustical tiles and panels in a water felting process wherein the conventional expanded perlite having a density in the range of 3 to 5 pounds per cubic foot is replaced by an expanded perlite having a density from above 7 or 8 pounds per cubic foot to 20 pounds per cubic foot range and preferably density in the 9 to 18 pounds per cubic foot range.

It is an object of this invention to provide an acoustical tile composition which may be more efficiently fabricated into acoustical tiles and panels in a water felting process, wherein some or all of the mineral wool is replaced by an expanded perlite having a density from over 7 or 8 pounds per cubic foot to 20 pounds per cubic foot range and preferably in the 9 to 18 pounds per cubic foot range.

It is another object of this invention to provide a mineral wool-free acoustical tile composition having acoustical properties comparable to the mineral wool tiles made by a water-felting process.

It is a further object of this invention to provide an acoustical tile composition comprising expanded perlite, clay and a binder selected from the group consisting of starch, latex, cellulosic fiber and mixtures thereof.

These and other objects will be apparent to persons skilled in the art in view of the description that follows.

SUMMARY OF THE INVENTION

It has been discovered that substituting a relatively high density, expanded perlite for conventional, low density expanded perlite in a composition containing expanded perlite, clay, a binder selected from the group consisting of starch, latex, cellulosic fiber and mixtures thereof and optionally mineral fiber, produces a composition which can be used to more efficiently manufacture acoustical ceiling tiles and panels employing equipment and procedures currently used in a water-felting process to produce acoustical tiles and panels. In the preferred embodiment, the composition includes relatively high density, expanded perlite, clay, cellulose fiber, starch and optionally mineral fiber. It has been found that by using the relatively high density perlite expanded to have a density of over 7 or 8 pounds per cubic foot, rather than conventional expanded perlite in the normal density range of 3 to 5 pounds per cubic foot, the acoustical tile composition of the present invention exhibits less water retention by the perlite, improved vacuum dewatering, improved board compressive strength, and maintained fire ratings. The composition may also contain a reduced amount of mineral wool or it may contain no mineral wool. The dried product can be formed into tiles or panels having comparable acoustical properties with commercially available acoustical tiles. The acoustical tiles made from the compositions of this invention have acceptable physical properties for use in suspended ceiling systems. In addition, the compositions may contain waste newsprint and/or waste (scrap) acoustical tiles and panels which are environmentally friendly.

DETAILED DESCRIPTION OF THE INVENTION

The present invention relates to an acoustical tile composition containing expanded perlite that can be used in a water felting process to make ceiling tile. The water felting process to which the present invention pertains comprehends the formation of an aqueous slurry comprising expanded perlite, clay, a binder selected from the group consisting of starch, latex, cellulosic fiber and mixtures thereof and optionally mineral fiber with sufficient water to make the slurry to be flowable. The aqueous slurry is flowed onto a moving foraminous support wire where it forms a cake which is dewatered, first by gravity and then by vacuum. The dewatered cake is then pressed to a selected thickness to form a basemat. The pressing step further dewaters the basemat. The basemat is then passed in to a drying kiln in which the moisture in the basemat is reduced to less than 5% and preferably less than 1% for the final product.

The acoustical tile compositions of this invention generally include relatively high-density expanded perlite, clay, and a binder selected from the group consisting of starch, latex, cellulosic fiber and mixtures thereof and may include mineral fiber and other conventional additives. In the preferred embodiment, the composition includes relatively high density, expanded perlite, clay, cellulose fiber, starch and optionally mineral fiber. The present invention is not limited to any precise amounts of materials. Those skilled in the art will recognize that the maximum benefits of the present invention are achieved by compositions that include the maximum amount of perlite, provided the required physical properties of the product are maintained. In general, the present invention contemplates compositions containing the following components in the amounts shown in Table 1.

TABLE 1

| Ingredient | Weight Percent (Useable Range) | Weight Percent (Preferred Range) | Preferred Percentage |
| --- | --- | --- | --- |
| Perlite | Up to 75% | 15 to 70% | 65% |
| Clay | 4 to 20% | 10 to 16% | 14% |
| Cellulose Fiber | 0 to 20% | 3 to 18% | 10% |
| Starch | 0 to 15% | 3 to 12% | 6% |
| Latex | 0 to 10% | 0 to 5% | 0 |
| Mineral Fiber | 0 to 85% | 5 to 65% | 5% |
| Total | | | 100% |

The acoustical tile compositions of the present invention are based on using a selected expanded perlite having a relatively high density as a replacement, either partial or complete, for the conventional low density expanded perlite. The composition also contains clay, and a binder component which may be starch, latex, cellulose fiber or mixtures thereof and the composition may also contain other additives, such as flocculents, coagulants and surfactants, normally included in acoustical ceiling tile formulations. As noted above, the composition may contain some mineral wool (in reduced amount), however, it has been found that the compositions of this invention can be used to make mineral wool-free acoustical tiles and panels.

It has been found that by using the relatively high density perlite, i.e. a perlite which has been expanded to a density of over 7 or 8 pounds per cubic foot, rather than conventional expanded perlite in the normal density range of 3 to 5 pounds per cubic foot, an aqueous slurry of the acoustical tile composition, suitable for use in a water felting process, can be formed with a lower quantity of water. The aqueous slurry with less water requires less dewatering, and produces a basemat having less water retained by the perlite. The resulting product has improved compressive resistance and maintained fire ratings, as defined by ASTM Test No. E119. The basemat having a lower water content can be dried faster which allows the entire water felting line to be run at higher speed. It has been found that the relatively high-density perlite expanded to a density of over 7 or 8 pounds per cubic foot, can be used to replace some or all of the mineral wool in manufacturing ceiling tiles or panels using a water-felting process.

The expanded perlite is used in the ceiling tile composition based on a percentage by weight. For example, a ceiling tile composition may contain as much as 75% by weight perlite. Substituting relatively high-density perlite for the conventional perlite does not change the volume of the final ceiling tile product significantly because during the water felting process the basemat is pressed to a selected thickness before being dried in the kiln. It has been found that perlite having a density as high as 20 pounds per cubic foot has sufficient loft to produce a final product with no significant loss of volume.

The first key ingredient in the novel acoustical tile composition of the present invention is relatively high density expanded perlite. It is well known in the art to use expanded perlite in acoustical tile compositions. Expanded perlite, and other lightweight aggregate materials, have been used in acoustical tile because of their low cost and low density (e.g. 3 to 5 pounds per cubic foot). The expanded perlite provides porosity in the composition that enhances acoustical properties. A medium grade expanded perlite provides sufficient porosity and acceptable texturability.

Perlite is a form of glassy rock, similar to obsidian with the capacity to expand greatly on heating. Perlite generally contains 65–75% $SiO_2$, 10–20% $Al_2O_3$, 2–5% $H_2O$, and smaller amounts of soda, potash, and lime. Expanded perlite denotes any glass rock and more particularly a volcanic glass that has been expanded suddenly or "popped" while being heated rapidly. This "popping" generally occurs when the grains of crushed perlite are heated to the temperatures of incipient fusion. The water contained in the particles is converted into steam and the crushed particles expand to form light, fluffy, cellular particles. Volume increases of the particles of at least ten fold are common. Expanded perlite is generally characterized by a system of concentric, spheroidal cracks, which are called perlite structure. Different types of perlite are characterized by variations in the composition of the glass affecting properties such as softening point, type and degree of expansion, size of the bubbles and wall thickness between them, and porosity of the product.

In the conventional method of preparing expanded perlite, the perlite ore is first ground to a fine size. The perlite is expanded by introducing the finely ground perlite ore into the heated air of a perlite expander. Typically the expander heats the air to about 1750° F. The finely ground perlite is carried by the heated air which heat the perlite which causes it to pop like popcorn to form the expanded perlite having a density of about 3 to 5 pounds per cubic foot. Expanded perlite is a very lightweight material, but it contains many fine cracks and fissures. When expanded perlite is placed in contact with water, the water penetrates the cracks and fissures and enters into the air filled cavities of the perlite, thereby causing the perlite to retain a very large amount of water within the expanded perlite particles.

The present invention is based on the discovery that expanded perlite having a higher density does not absorb as much water as conventional 3 to 5 pound per cubic foot perlite.

The expanded perlite of the present invention has a density of from above 7 or 8 pounds per cubic foot to as high as about 20 pounds per cubic foot and preferably a density of from about 9 to about 18 pounds per cubic foot. Such relatively high density perlite may be prepared by operating conventional perlite expanders at a temperature somewhat lower (e.g. 1375° F.) than used to produce conventional expanded perlite. Alternatively, the relatively high density perlite may be prepared by feeding the ground perlite ore to the expander at a greater rate (e.g. 95 pounds per minute v 75 pounds per minute).

It has been found that the amount of water retained by the perlite diminishes gradually as the density of the perlite is increased above the 3 to 5 pounds per cubic foot density of conventional expanded perlite. Perlite having a density of over 7 or 8 pounds per cubic foot provides a significant reduction in water retention compared to conventional expanded perlite. The water retention of the perlite further diminishes as the density increases over 9 pounds per cubic foot. However, when the density of the expanded perlite exceeds about 20 pounds per cubic foot, the perlite does not produce as much "loft" or bulk in the final product and, as a result, the density of the final produce may be too high to maintain the low thermal conductivity required to pass the ASTM E119 fire endurance test. Using perlite having a density greater than 20 pounds per cubic foot will also require the use of more perlite and thus increase the cost of the final product. The expanded perlite preferably has a density in the 9 to 18 pounds per cubic foot range to give the best combination of low water retention and best product performance.

The perlite ore used in the Examples reported below was purchased from Harborlite Corporation of Antonito, Colo. and expanded in the commercial expansion facilities of USG Corporation. Perlite ore from different sources, including the USG deposit at Lovelock, Nev., have been evaluated. No difference was noted during the perlite expansion or the basemat formation due to the characteristics of the perlite ore. The size of the expanded perlite particles is not critical and it is not deemed to be necessary to use a particularly fine perlite size. Expanded perlite having the following screen analysis, as shown in Table 2 may be used:

TABLE 2

| Standard Sieve | Percent |
|---|---|
| +30 | Trace |
| −30 to +50 | 0–10% |
| −50 to +100 | 59%–100% |
| −100 to +200 | 90%–100% |
| −200 | 10% Maximum |

The second key ingredient, which also is not novel in acoustical compositions, is clay. It is deemed essential to use at least 4% and preferably at least 10% by weight of clay in the ceiling tile formulation in order to impart fire resistance (as defined by ASTM Test No E119) because the clay sinters during the fire endurance test. In the Examples which follow, a commercially available Ball Clay from Gleason, Tenn. was used. Other clays that have been used include CTS-1 from KT Clay of Sledge, Miss., CTS-2 from KT Clay of Sledge, Miss., Spinks Clay from Gleason, Tenn. and Old Hickory Clay from Hickory, Ky. Other commercial clays such as Kaolin and Bentonite etc. can be used in the ceiling tile formulation.

A third preferred ingredient in the novel acoustical tile compositions of this invention is the cellulosic fiber, which serves as a bulking agent. The cellulose fiber may also function as a binder and to retain fines. Several types of cellulosic fiber have been evaluated in these compositions. It is well known to use newsprint in acoustical tile formulations, and both hammer-milled and hydro-pulped newsprint have been evaluated in these compositions. Refined paper fibers and wood fiber may also be used as the source of the cellulosic fiber, however, it has been found that ceiling tiles made with wood fiber, either softwood or hardwood, are more difficult to cut with a knife at the installation site. Furthermore, wood fibers are a more expensive source of the cellulosic fiber.

The fourth principal ingredient is the binder component, which is an essential component. The binder may be selected from the group consisting of starch, latex. cellulose fibers and mixtures thereof. Starch is the preferred binder. It is well known to use starch as a binder in mineral wool-based acoustical tiles. A starch gel may be prepared by dispersing starch particles in water and heating the slurry until the starch is fully cooked and the slurry thickens to a viscous gel. A portion of the cellulosic fibers may be incorporated into the starch slurry prior to cooking. The cooking temperature of the starch slurry should be closely monitored to assure full swelling of the starch granules. A representative cooking temperature for cornstarch is about 180° F. (82° C.) to about 195° F. (90° C.). Starch may also be used as a binder without pre-cooking the starch, because it forms a gel during the process of drying the basemat.

A latex binder may be used in place of the starch or cellulose fiber or the latex may be used in combination with the starch and/or cellulose fiber binder. Many of the latex binders useful in acoustical ceiling formulations are disclosed in U.S. Pat. No. 5,250,153. As set forth therein, one of the problems with acoustical panels employing a starch binder is excessive sag, especially in high humidity conditions. It is well known in the art to use thermoplastic binders (latexes) in acoustical tiles based on mineral wool. These latex binders may have a glass transition temperature ranging from about 30° C. to about 110° C. Examples of latex binders include polyvinyl acetate, vinyl acetate/acrylic emulsion, vinylidene chloride, polyvinyl chloride, styrene/acrylic copolymer and carboxylated styrene/butadiene The ceiling tile of the present invention may be made without starch or latex or cellulose fiber, but one at least one of them must be present. In the preferred embodiment, the composition includes both cellulose fibers and starch.

In addition to the four principal ingredients, the acoustical compositions of this invention may also contain mineral wool of the type conventionally used in acoustical tiles, inorganic fillers such as mica, wollastonite, silica, calcium carbonate and other lightweight aggregates, surfactants and flocculents. These ingredients are well known to those skilled in the art of the preparation of acoustical tile compositions.

EXAMPLES

The following examples will serve to illustrate the preparation of several acoustical tile compositions within the scope of the present invention. It is understood that these examples are set forth for illustrative purposes and that many other compositions are within the scope of the present invention. Those skilled in the art will recognize that similar acoustical tile compositions may be prepared containing other quantities of materials and equivalent species of materials than those illustrated below.

Example 1

A continuous trial run was made using a conventional Fourdrinier machine. The trial started with the control formulation, shown below, wherein the perlite had a density of 5.0 pounds per cubic foot. The components of formulation were mixed together with sufficient water to produce an aqueous dispersion having the consistency show in Table 3. The resulting dispersion was passed through a headbox and flowed onto the moving foraminous wire of a Fourdrinier machine. The dispersion was first partially dewatered on the wire by gravity to form a cake. The cake was next passed through a vacuum suction area, which further dewatered the cake to form a mat. The mat was wet pressed to the caliper reported below and passed into the kiln to dry. The moisture of the mat at the point it entered the kiln was monitored and is reported in Table 3 as "Tipple Moisture".

The kiln had three drying zones. In zone 1, the temperature at the beginning was 400° F. and the temperature rose to 650° F. at the end. In zone 2, the average temperature was 550° F. The average temperature in zone 3 was 350° F. The speed of the line was adjusted to achieve proper drying of the mat as the mat is passed through the kiln.

The two Trial Formulations were prepared sequentially by substituting a relatively high density perlite for the conventional perlite and adjusting the volume of raw materials fed to the headbox and making the necessary adjustment to the line speed. Table 3, below, reports the formulations and the results of the trials:

TABLE 3

|  | Control (5.0 lb/cu ft) | Trial #1 High Density Perlite (10.0 lb/cu ft) | Trial #2 High Density Perlite (Low Wool Content) |
| --- | --- | --- | --- |
| Perlite (%) | 19.9 | 19.9 | 25.0 |
| Clay (%) | 13.0 | 13.0 | 13.0 |
| Starch (%) | 7.5 | 7.5 | 7.5 |
| Paper (%) | 4.7 | 4.7 | 6.0 |
| Wool (%) | 54.9 | 54.9 | 48.5 |
| Total | 100% | 100% | 100% |
| Consistency (solids) | 4.5% | 4.5% | 4.5% |
| Wet Caliper, inch | 0.700 | 0.690 | 0.690 |
| Solids, % | 35.8 | 38.2 | 38.8 |
| Tipple Moisture, % | 64.2 | 61.8 | 61.2 |
| Line Speed ft/min. | 31.8 | 35.2 | 38.5 |
| Combustible % | 13.1 | 13.0 | 13.3 |

Table 3 shows that there was a significant difference in the tipple moisture for these runs. Trial #1 demonstrates that the use of the high-density perlite resulted in a basemat having a lower tipple moisture going into the kiln for drying. Trial #2 demonstrates that replacing some of the mineral wool with high-density perlite further reduces the tipple moisture of the basemat. Because a kiln capable of evaporating a given amount of water per hour from a basemat having a 65% tipple moisture, at a given line speed, can evaporate the same amount of water from a basemat having a 60% tipple moisture at a higher line speed. As is shown by Table 3, the lower tipple moisture in Trail #1 and Trial # 2 allowed an increase in line speed by as much as 21%. The average stock flow increased as well. The higher stock flow during the mat formation had no adverse impact on dewatering and maintaining the line speed.

After drying, all of the test specimens were cut and subjected to 75° F./50% Relative Humidity conditions for at least 24 hours prior to testing. The specimens were tested for the following:

1) Density, thickness and MOR strength
2) Acoustical properties (NRC)
3) Dimensional stability (water absorption)

The physical properties, breaking load (for MOR) and hardness of the base mats from Trial 1 and Trial 2 (high-density perlite formula and high-density perlite/low wool formula) base mats were similar to the control base mat with the normal density perlite.

Example 2

Another plant trial (Trial 3) was run on the, as shown in Table 4, equipment described in Example 1 using the following composition:

TABLE 4

|  | Control (3.0 –6.0 lb/cu ft) | Trial #3 High Density Perlite (9.0 lb/cuft) |
| --- | --- | --- |
| Perlite (%) | 17.0 | 17.0 |
| Clay (%) | 12.0 | 12.0 |
| Starch (%) | 8.0 | 8.0 |
| Paper (%) | 4.0 | 4.0 |
| Wool (%) | 59.0 | 59.0 |
| Total | 100% | 100% |
| Consistency (solids) | 3.0 | 3.0 |
| Wet Caliper, inch | 0.690 | 0.690 |
| Solids, % | 30.0 | 41.4 |
| Tipple Moisture, % | 70.0 | 58.6 |
| Line Speed ft/min. | 28.0 | 33.0 |

After drying, all of the test specimens were cut and subjected to 75° F./50% Relative Humidity conditions for at least 24 hours prior to testing. The specimens were tested for the following:

1) Density, thickness and MOR strength
2) Acoustical properties (NRC)
3) Dimensional stability (water absorption)

The physical properties of the Trial board and the control board were comparable.

Example 3

Another plant trial (Trial 4) was run on the equipment described in Example 1 using the composition shown in Table 5:

TABLE 5

|  | Control (4.0 lb/cu ft) | Trial #4 High Density Perlite (12.0 lb/cu ft) |
| --- | --- | --- |
| Perlite (%) | 25.0 | 25.0 |
| Clay (%) | 12.6 | 12.6 |
| Starch (%) | 7.9 | 7.9 |
| Paper (%) | 6.0 | 6.0 |
| Wool (%) | 48.5 | 48.5 |
| Total | 100% | 100% |
| Consistency (solids) | 4.5% | 4.5% |
| Wet Caliper, inch | 0.700 | .700 |
| Solids, % | 31.0 | 36.8 |
| Tipple Moisture, % | 69.0 | 63.2 |
| Line Speed ft/min. | 29.0 | 37.4 |

After drying, all of the test specimens were cut and subjected to 75° F./50% Relative Humidity conditions for at least 24 hours prior to testing. The specimens were tested for the following:

1) Density, thickness and MOR strength
2) Acoustical properties (NRC)
3) Dimensional stability (water absorption)

The physical properties of the Trial board and the control board were comparable.

The forms of invention shown and described herein are to be considered only as illustrative. It will be apparent to those skilled in the art that numerous modifications may be made therein without departing from the spirit of the invention and the scope of the appended claims.

I claim:

1. In a continuous process for making acoustical tiles in a water-felting process which includes the steps of forming an aqueous slurry comprising expanded perlite, clay, optionally mineral wool and a binder component selected from the group consisting of starch, latex, cellulosic fiber and mixtures thereof with water, continuously flowing said slurry onto a moving foraminous support wire to form a cake, dewatering said cake to form a basemat, and drying said basemat to produce acoustical tile, the improvement comprising, in order to enable an increase in the speed of the process, forming said slurry from expanded perlite having a density a from about 9 pounds per cubic foot to about 20.0 pounds per cubic foot, and operating said process at a speed selected to continuously dewater said cake to form a high solids basemat and to continuously dry water from said high solids basemat to produce acoustical tile.

2. The continuous process described in claim 1, wherein said perlite has a density of from about 9 pounds per cubic foot to about 18 pounds per cubic foot.

3. The continuous process described in claim 1, wherein said dewatering said slurry produces a basemat having a solids content of at least 38% by weight before drying.

4. The continuous process described in claim 3, wherein said perlite has a density of from about 9 pounds per cubic foot to about 18 pounds per cubic foot.

5. The continuous process described in claim 1, wherein said process comprises forming a slurry by admixing up to 75% by weight of expanded perlite, from about 4 to 20% by weight of clay, up to 15% starch, up to 20% cellulosic fiber and 0 to 85% by weight of mineral wool, with water.

6. The continuous process described in claim 5, wherein said perlite has a density of from about 9 pounds per cubic foot to about 18 pounds per cubic foot.

7. The continuous process described in claim 5, wherein said dewatering said slurry produces a basemat having a solids content of at least 38% by weight before drying.

8. The continuous process described in claim 7, wherein said perlite has a density of from about 9 pounds per cubic foot to about 18 pounds per cubic foot.

9. The continuous process described in claim 1, wherein said process comprises forming a slurry by admixing 15 to 70% by weight of expanded perlite, 10 to 16% by weight of clay, 3 to 12% starch, 3 to 18% by weight of cellulosic fiber and 5 to 65% by weight of mineral wool with water.

10. The continuous process described in claim 9, wherein said perlite has a density of from about 9 pounds per cubic foot to about 18 pounds per cubic foot.

11. The continuous process described in claim 9, wherein said dewatering said slurry produces a basemat having a solids content of at least 38% by weight before drying.

12. The continuous process described in claim 11, wherein said perlite has a density of from about 9 pounds per cubic foot to about 18 pounds per cubic foot.

13. The continuous process described in claim 1, wherein said process comprises forming a slurry by admixing about 65% by weight of expanded perlite, about 14% by weight of clay, about 6% by weight starch, about 10% by weight cellulosic fiber about 20% by weight of mineral wool, with water.

14. The continuous process described in claim 13, wherein said perlite has a density of from about 9 pounds per cubic foot to about 18 pounds per cubic foot.

15. The continuous process described in claim 13, wherein said dewatering said slurry produces a basemat having a solids content of at least 38% by weight before drying.

16. The continuous process described in claim 15, wherein said perlite has a density of from about 9 pounds per cubic foot to about 18 pounds per cubic foot.

* * * * *